United States Patent [19]

Pweblo

[11] 4,437,866

[45] Mar. 20, 1984

[54] POLLUTION HARNESS

[76] Inventor: Harry Pweblo, 4009 E. 131st St., Cleveland, Ohio 44105

[21] Appl. No.: 409,731

[22] Filed: Aug. 24, 1982

[51] Int. Cl.³ .............................................. B01D 47/00
[52] U.S. Cl. .............................................. 55/85; 55/89; 55/90; 55/93; 55/260; 261/116; 261/DIG. 9; 110/215
[58] Field of Search ............ 55/85, 89, 90, 73, 93–95, 55/223, 260, 228, 342, DIG. 30; 261/116, DIG. 9; 110/215, 216, 203; 422/169, 168

[56] References Cited

U.S. PATENT DOCUMENTS

| 517,297 | 3/1894 | Reiss | 261/17 |
|---|---|---|---|
| 585,568 | 6/1897 | Greiwe | 55/260 |
| 1,103,304 | 7/1914 | Lent | 261/17 |
| 3,465,504 | 9/1969 | Oropeza | 261/17 |
| 3,733,788 | 5/1973 | Crowley | 55/228 |
| 3,950,493 | 4/1976 | Dorr et al. | 55/73 |
| 3,993,448 | 11/1976 | Lowery | 261/DIG. 9 |
| 4,305,909 | 12/1981 | Willet et al. | 55/73 |
| 4,375,976 | 3/1983 | Potter | 55/85 |

Primary Examiner—Bernard Nozick
Attorney, Agent, or Firm—Watts, Hoffmann, Fisher & Heinke Co.

[57] ABSTRACT

A system and method for removing flue gasses like smoke from the atmosphere including mixing the smoke with water and then reducing the contaminants like bacteria from the water where the water is used in conjunction with chemical additives for removing entrained solids from the smoke.

11 Claims, 3 Drawing Figures

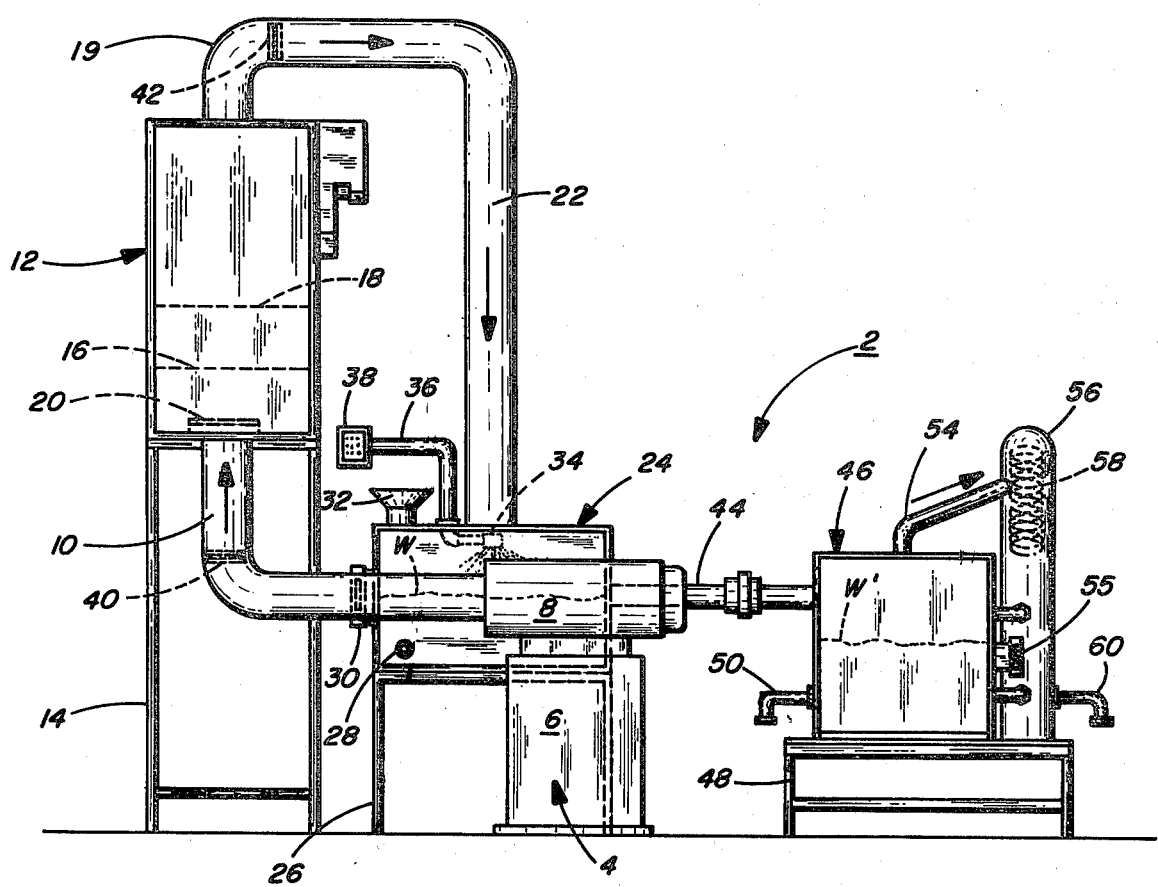
FIG. 1
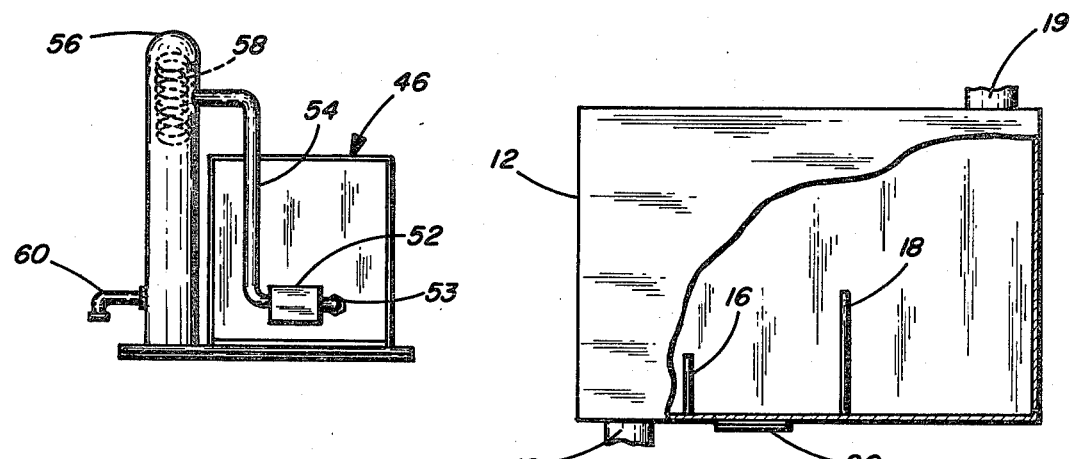
FIG. 3
FIG. 2

4,437,866

POLLUTION HARNESS

DESCRIPTION

Technical Field

The present invention relates to a system and method for removing flue gases like smoke, and more particularly relates to a new and improved system and method for mixing flue gases like smoke with water and then reducing the contaminents like bacteria from the water, and more particularly to what might be termed a wet scrubbing system for removing bacteria from water where the water is used in conjunction with chemical additives for removing the entrained solids from the flue gases.

Background Art

The system and method of the present invention includes such a wet scrubbing apparatus which is known by the Applicant as PWEBLO'S POLLUTION HARNESS. Heretofore, the discharge of flue gases from different types of commercial and industrial firing plants including blast furnaces, open hearth furnaces and other types of industrial furnaces has represented a problem of increasing importance because of the environmental quality of the air, and especially the air we breath and the water we drink. Accordingly, the present invention assists in the elimination of various pollutants from our environment from a potential source of pollution, namely, from flue gases discharged from commercial and industrial type furnaces.

More specifically, the discharged flue gases from such type of commercial and industrial furnaces has become an increasing problem primarily because of the quantities of $SO_2$ and soot which contaminate the air. Accordingly, it is becoming more and more important to find ways that mean the removal of such impurities from flue gases in an effective economic manner in order to prevent the damage which such impurities cause, such as corrosion, poisoning, smog formation and the like. Typical prior art systems are identified in the following U.S. Pat. Nos.:

| | |
|---|---|
| 2,180,849 | 3,724,173 |
| 3,315,443 | 3,733,787 |
| 3,640,053 | 3,914,328 |
| 3,687,613 | 4,047,891 |

Accordingly, it is a primary object of the present invention to provide a system and method for smoke removal which overcomes the disadvantages and problems present in prior systems.

Disclosure of the Invention

Therefore, it is an object of the invention to provide a system and method for controlling the bacteria level in the water stream without effecting opacity and odor of the water.

It is another object of the present invention to provide a system and method that will allow the exhaust gas stream to be exhausted to the atmosphere without substantially endangering the environmental quality of the surrounding air.

Therefore, the present invention provides a pollution harness system and method for substantially reducing the smoke control by a water stream which comprises the steps of passing the flue gases (i.e., smoke) into a first chamber wherein the larger size particles are mechanically separated and moved by gravity, passing the partially cleansed flue gas into a second chamber wherein the gas is contacted with cooling water in the form of a jet fluid stream and chemical additives for suspending finely divided particles in the water and for dissolving and mixing the chemical additives with the water, passing the further reduced effluent into a third chamber by gravity flow where the effluent is contacted further with the water and relatively larger size particles are separated, passing the effluent into and through a filter chamber and discharging the effluent therefrom so as to provide a substantially clean, odor-free water stream, and re-cycling the water discharged from the filter chamber back through the second mentioned chamber for admixing with the effluent discharged from the first mentioned chamber.

The invention will be more clearly described and illustrated with reference to the attached drawings which are schematic representations of specific embodiments of the invention.

BRIEF DESCRIPTION OF THE DRAWINGS

FIG. 1 is a schematic, front elevation view of the gas scrubber system of the present invention;

FIG. 2 is a fragmentary, side elevation view of the primary collector tank in accordance with the present invention; and, FIG. 3 is a fragmentary, rear elevation view illustrating the part system for delivering fluid to the filtration tank.

BEST MODE FOR CARRYING OUT THE INVENTION

Referring again to the drawing and in particular to FIG. 1 thereof, there is illustrated the gas scrubber system of the present invention, designated generally at 2, for cleaning a fluid (i.e. furnace gas) in accordance with the principles of the present invention. As shown, the system includes an energy source, such as a coal furnace, designated generally at 4, which may include a base 6 and an upper plenum 8 for burning a source of energy (i.e. coal) for discharge of the gas (i.e. smoke) through a pipe 10 into a primary collector tank 12. In the invention, it will be understood that the furnace 4 is given by way of example and may comprise any type of combustion furnace for producing heat energy, such as a cupola, blast furnace, open hearth furnace or the like.

The primary collector tank 12 is mounted on a suitable support frame 14 and is preferably of a rectangular construction having first 16 and second 18 laterally spaced partition members (FIG. 2) which act as a baffle for separating and retaining dirt or dust laden particles removed from the gas. This tank has a length of 6 feet, a height of 4 feet and a width of 2 feet for volume of 48 cubic feet. The tank 12 has an exit door, as at 20, to provide ingress and egress for purposes of cleaning the interior of the tank, as desired. As shown, the pipe 10 is in the form of an elbow construction having a right angle so as to communicate with the collector tank 12 which is located above the furnace 4.

The roof or ceiling of the tank 12 communicates with an outlet pipe 19 which is of an inverted L-shaped configuration which extends outwardly and then downwardly, as at 22, so as to communicate with a second or intermediate collector tank 24 which is disposed below the primary collector tank 12. As shown, the intermediate collector tank 24 is of a rectangular configuration and is preferably partially filled with water to a level of about ¾ of its volume, as at W. This tank has a size length of 6 feet, a height of 2 feet and a width of 2 feet for a volume of 24 cubic feet. Here again, this intermediate tank 24 is mounted on a support frame 26 and includes an outlet drain 28 and a water gauge, as at 30, for maintaining the desired water level within the tank. An inlet funnel 32 may be provided for adding predetermined chemicals to the liquid bath, as will hereinafter be more fully described.

The chemicals added are preferably a mixture of calcium and sulphur at the weight ratio of 4:1. The chemical additives act to better mix the solids content in the water and to absorb the entrained particles that are held in suspension in the water. Preferably, the chemicals provide an akaline bath with a pH of between 6 and 7.8. The calcium and sulphur are substantially in pure form.

In accordance with the invention, the intermediate tank is provided with a fluid (i.e. water) jet-spray system including a rotatable spray head 34 which communicates via a pipe 36 to a suitable timer, as at 38, for selectively delivering water under pressure to the interior of the intermediate tank 24. Accordingly, the gas to be cleaned which is delivered from the tank 12 passes through the pipe sections 19 and 22 and into the intermediate tank 24 adjacent the area of the rotatable sprinkler head 34 wherein it is fluidized by the water spray as it enters the tank 24. Accordingly, this action acts to mix and wet the incoming gas so as to facilitate removal of entrained dirt and dust particles held within the gas. Also, this spraying action acts to carry the dust and dirt laden particles from the incoming dust-laden air into the water bath of the tank 24.

In the invention, the inlet pipe 10 and outlet pipe sections 18 and 20 preferably have a diameter of approximately 8 inches and each pipe has a blower, as at 40 and 42, for forcing the dust-laden air under pressure to and from the primary tank 12 to the intermediate tank 24.

From the tank 24 the dust-laden air now entrained in the water is delivered, by gravity, via a pipe 44 to a tertiary tank 46 which is preferably also partially filled to ¾ full with liquid (i.e. water), as at W. This tank has a length of 3 feet, a height of 2 feet and a width of 2 feet for a volume of 12 cubic feet. Accordingly, the tertiary tank 46 is disposed and arranged so that the water level W in the tank is disposed below that of the intermediate tank 24 so that the water from tank 24 can flow under gravity to the tank 46. The tank 46 is also mounted on a support frame 48 and may be provided with a suitable outlet drain 50 for draining the tank, as desired. In the invention, the tank 46 further acts to receive dust-laden liquid from the tank 24 which liquid is then pumped by means of a ¾ HP electric pump 52 (FIG. 3) from the tank through an outlet pipe 54 to a filter tank 56. An outlet pipe 53 is connected to the tank 46 to the pump 52 such that the pump 52 can pump water from the tank 46 up through the pipe 54 to the filter tank 56. Preferably, the filter tank may be provided with an interior fabric (nylon net with about ⅛, 2 inch openings) material, as at 58, which acts to collect the dust-laden particles from the liquid (i.e. water) delivered from the tank 46 through the pipe 54. The tertiary tank may also have a suitable water gauge, as at 55, for maintaining the predetermined desired water level within the tank.

Accordingly, in the invention it will be seen that the system comprises a primary dust collector tank 12 which is located above the outlet to the dust source (i.e. furnace) with a first liquid water tank 24 disposed below the collector tank 12 and a second water tank 46 disposed so its water level is disposed below the water level of the first water tank 24 so that water ultimately delivered from the filter tank 56 via outlet drain 60 is substantially free of dust or dirt particles, thereby to reduce the bacteria content of the water.

In the invention, it will be recognized that the outlet conduit, as at 60, may be connected back to the intermediate tank 24 for re-cycling the fluid output from the filter tank 56. Accordingly, other and futher objects of the invention will become apparent when taken in conjunction with the following claims.

In the invention it is recognized that one of the primary purposes of the system and method of the invention is for the treatment of discharged flue gases like smoke from different types of firing plants including, for example, industrial processes like blast furnaces, open hearth furnaces and the like. Accordingly, in the invention there is herein given an example of an operation of the harness system for treating flue gases like smoke emitted from the furnace 6. The flue gases emitted from the furnace 6 are at approximately combustion temperature. Here, the furnace could burn about 100 pounds of coal/hour. By the pump 40, the flue gas is forced at atmospheric pressure by the blowers 40 and 42. In this example, the tank 12 has a volume of approximately 48 cubic feet. The flow-rate of the spray nozzle 34 is approximately 60 gallons per hour at 30 p.s.i. pressure with the chemicals being added at the rate of approximately 5 pounds per hour. This would include 4 pounds of calcium and 1 pound of sulphur. The size of the tank 24 is approximately 24 cubic feet with the water in the tank being maintained at approximately ambient temperature. The flow-rate of the fluid out of the tank 24 is approximately 60 gallons per hour which is substantially the same as the input from the spray nozzle 34. The tank 46 has a volume of approximately 12 cubic feet. Thus the water discharged from the filter will have a flow-rate of approximately 60 gallons per minute.

In the invention, it has been found that the water discharged from the filter is substantially clear in color and is substantially odor free and drinkable. If any odor existed, it was not deemed to be objectionable. In one test, the water was found to have:

Standard plate count (bacteria) per milliliter of less 1;
Chloriform count per mililiter (50) less 2; pH of 7.2
Alkalinity 88 p.p.m.

In the invention, the chemicals added to the tank 24 through the inlet 32 make the water content of the tank about neutral. Preferably, the liquid is maintained at a pH from about 6 to about 7.8 by regulating the flow of chemicals into the tank 24.

| Constituent | Water Sample # | | | |
| --- | --- | --- | --- | --- |
| | 1 | 2 | 3 | 4 |
| Alkalinity, mg/l | 60 | 60 | 60 | 86 |
| BOD5, mg/l | 58.3 | 56.7 | 57.2 | |
| Chloriform Total #/100 ml | 0 | 0 | 0 | |
| Nitrate - N, mg/l | 58.50 | 57.50 | 61.25 | |
| Ammonia - N, mg/l | 5.60 | 4.48 | 6.10 | |
| Organic - N, mg/l | 1.45 | 2.15 | 1.40 | |
| Total Kjeldahl - N, mg/l | 7.05 | 6.63 | 7.50 | |
| pH | 7.3 | 7.9 | 7.8 | 6.9 |
| Dissolved Solids, mg/l | 1070 | 910 | 930 | 608 |
| Suspended Solids, mg/l | 47 | 40 | 15 | 8 |
| Volatile Suspended Solids, mg/l | 80 | 75 | 45 | |
| Total Solids, mg/l | 1100 | 1020 | 970 | 616 |

| | Water Sample # | | | |
|---|---|---|---|---|
| Constituent | 1 | 2 | 3 | 4 |
| Volatile Total Solids, mg/l | 815 | 825 | 775 | |
| Calcium mg/l | | | | 41.7 |

In the invention, the flow-rate through the tanks 24 and 46 is maintained relatively constant so as to keep the water level in the tanks at about ½-full. A suitable liquid level control device (not shown) may be disposed in the tank 24 so as to automatically control water introduced through the pipe 36 and the timer 38 to maintain the quantity of liquid in response to changes in the level of the liquid which may result from evaporation or the like. Accordingly, the liquid flow may be regulated by suitable valves adjusted to maintain a substantially uniform rate of flow through the connecting pipes.

What is claimed is:

1. A harness system for removing smoke from a combustion furnace comprising:
a first collector chamber having an inlet pipe communicating with a combustion furnace, a second collector chamber having pipe means communicating with said first collector chamber and disposed below said first collector chamber, said second collector chamber having jet spray nozzle means for impinging water under pressure into said chamber, said second collector chamber including inlet gate means for introducing a chemical additive to said chamber in the area adjacent to said jet spray means, a third collector chamber having further pipe means communicating with said second collector chamber, said third collector chamber being disposed below said second collector chamber such that water introduced into said second collector chamber by said jet spray means is delivered, by gravity, to said third collector chamber, said third collector chamber being disposed in fluid communication with a filter means, and fluid pump means disposed for delivering liquid under pressure in said third collector chamber into said filter means, and said filter means having outlet means for discharging water introduced into said second collector chamber.

2. A system in accordance with claim 1, wherein said first collector chamber includes baffle plate means disposed for removing solid particles from said flue gases.

3. A system in accordance with claim 1, wherein said second collector chamber has timer means associated with said jet spray means for regulating the flow of water to the interior of said chamber.

4. A system in accordance with claim 1, wherein first and second blower means are operably associated with said first and second collector chambers for deivering said flue gases under pressure to said second collector chamber.

5. A system in accordance with claim 1, wherein said filter means includes an upstanding housing enclosing a fabric mesh for removing particulate material pumped from said third collector chamber.

6. A system in accordance with claim 1, wherein pump means are disposed for pumping water from said third collector chamber into said filter means, and said filter means having outlet means adapted to be connected back to said second collector chamber for recycling the water in a continuous process.

7. A process for controlling pollution resulting from flue gases like coal as produced from a combustion furnace, the steps comprising a source of combustion of flue gases like smoke, delivering said smoke to a first collector chamber and separating larger size entrained particles from said smoke in said chamber, delivering the smoke from said first collector chamber to a second collector chamber, bringing the smoke in said second collector chamber into contact with a jet-like water spray in said chamber, selectively feeding a chemical mixture into said second collector chamber in the vacinity of said jet-like water spray, delivering said smoke from said second collector chamber into a third collector chamber, said second and third collector chambers each being at least partially filled with water and continuously introducing water into said second collector chamber and delivering the water in said second collector chamber by gravity, to said third collector chamber, delivering the water from said third collector chamber to a filter means and filtering entrained particles from said water, and discharging the filter water from said filter means.

8. A process in accordance with claim 7, including continuously adding said chemical mixture to said second collector tank, and said mixture including calcium and sulphur.

9. A process in accordance with claim 8, wherein the calcium and sulphur are present in the weight ratio of 4 to 1.

10. A process in accordance with claim 9, wherein said water is continuously circulated to said system at a flow rate of approximately 60 gallons per hour and said chemical addition is made at the rate of approximately 5 pounds per hour.

11. A process in accordance with claim 9, wherein the output water from said filter means is recycled back to said second collector chamber for a continuous operation.

* * * * *